United States Patent
Aoyama

(10) Patent No.: US 7,389,326 B2
(45) Date of Patent: *Jun. 17, 2008

(54) PORTABLE TERMINAL DEVICE HAVING A FUNCTION OF CONNECTING TO A PRESCRIBED SERVER DEVICE THROUGH A COMMUNICATION CONNECTION AND COMMUNICATION CONNECTION METHOD THEREOF

(75) Inventor: Susumu Aoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/591,499

(22) Filed: Nov. 2, 2006

(65) Prior Publication Data

US 2007/0049328 A1    Mar. 1, 2007

Related U.S. Application Data

(63) Continuation of application No. 10/205,612, filed on Jul. 26, 2002, now Pat. No. 7,149,781.

(30) Foreign Application Priority Data

Jul. 26, 2001 (JP) .............................. 2001-225958

(51) Int. Cl.
*G06F 13/00* (2006.01)

(52) U.S. Cl. .................................................... 709/206
(58) Field of Classification Search ..................... None
See application file for complete search history.

(56) References Cited

U.S. PATENT DOCUMENTS 6,961,590 B1   11/2005   Toebes
6,965,413 B2   11/2005   Wada

*Primary Examiner*—Robert B Harrell
(74) *Attorney, Agent, or Firm*—Staas & Halsey LLP

(57) ABSTRACT

A connection operation for connecting a portable terminal to a prescribed server device can be carried out in an extremely simple and prompt manner. Thus, for example, an inquiry operation for inquiring about mail reception to the server device can also be performed extremely simply and quickly. A cellular phone (20) includes a main operation part (25) and a main LCD (21) which are coupled with each other in such a manner that they can be opened and closed with respect to each other. A rear key (22) is arranged on a rear surface of the cellular phone (20) in such a manner that it can be operated by a user. A sub LCD (23) is provided on the rear surface of the cellular phone (20) in such a manner as to be able to display prescribed information based on an operation of the rear key (22). By detecting when the rear key (22) is kept depressed for a predetermined time or longer, the cellular phone (20) is connected to the server device for receiving electronic mails, so that prescribed information from this server device is displayed on the sub LCD (23).

11 Claims, 5 Drawing Sheets

Fig. 3

| Opened/Closed | Communication | Conditions | Pressing mode | Functions |
|---|---|---|---|---|
| Opened | Waiting | Clear screen displayed | Short press | Play back message memo. |
| | | | Long press | Inquiry to center (mail). |
| | | Alarm operated | Short press | Transfer alarm to snooze. |
| | | | Long press | Null |
| | | Alarm snoozed | Short press | Null |
| | | | Long press | Null |
| | | Alarm timer operated | Short press | Stop alarm timer. |
| | | | Long press | Null |
| | | Alarmed screen displayed | Short press | Play back message memo. |
| | | | Long press | Inquire to center (mail). |
| | Receiving | | Short press | Null |
| | | | Long press | Start recording message memo. |
| | Holding answer | | Short press | Null |
| | | | Long press | Start recording message memo. |
| | Communicating | | Short press | Start/stop recording voice memo. |
| | | | Long press | Null |
| | Receiving during communication | | Short press | Start/stop recording voice memo. |
| | | | Long press | Null |
| | Talking among three persons | | Short press | Start/stop recording voice memo. |
| | | | Long press | Null |
| Closed | Waiting | Clear screen displayed | Short press | Switch display to sub LCD. |
| | | | Long press | Inquire to center (mail). |
| | | Alarm operated | Short press | Transfer alarm to snooze. |
| | | | Long press | Null |
| | | Alarm snoozed | Short press | Stop alarm. |
| | | | Long press | Null |
| | | Alarm timer operated | Short press | Stop alarm timer. |
| | | | Long press | Null |
| | | Alarmed screen displayed | Short press | Stop alarm timer. |
| | | | Long press | Null |
| | Receiving | | Short press | Null |
| | | | Long press | Record message memo. |
| | Holding answer | | Short press | Null |
| | | | Long press | Record message memo. |
| | Communicating | | Short press | Start/stop recording voice memo. |
| | | | Long press | Null |
| | Receiving during communication | | Short press | Start/stop recording voice memo. |
| | | | Long press | Null |
| | Talking among three persons | | Short press | Start/stop recording voice memo. |
| | | | Long press | Null |

PORTABLE TERMINAL DEVICE HAVING A FUNCTION OF CONNECTING TO A PRESCRIBED SERVER DEVICE THROUGH A COMMUNICATION CONNECTION AND COMMUNICATION CONNECTION METHOD THEREOF

CROSS-REFERENCE TO RELATED APPLICATIONS

This application is a continuation of U.S. application Ser. No. 10/205,612, filed Jul. 26, 2002, now U.S. Pat. No. 7,149,781, the subject matter of which is herein incorporated by reference.

BACKGROUND OF THE INVENTION

1. Field of the Invention

The present invention relates to a portable terminal and a communication connection method thereof with a function of performing connection to a prescribed server device through a communication line, and more specifically, it relates to improvements in the operation for carrying out inquiries about mail or message information and/or download of data (hereinafter simply referred to as inquiries) with respect to the server device which receives electronic mails and message information.

2. Description of the Related Art

There have hitherto been known portable terminals such as cellular phones which have the function of inquiring about the reception of electronic mails (hereinafter also simply referred to as mails) to a server device which receives such electronic mails, and downloading the mails, if received, from the server device to the portable terminals. In such known portable terminals, the operational procedure for making inquiries about received mails is carried out as follows. That is, a menu is first called in which a plurality of functions are able to be displayed, and items relating to electronic mails are then selected from the menu. Thereafter, by directing and selecting items to be inquired about at a mail center (i.e., mail server device), a portable terminal is connected to the mail center and an inquiry is made as to whether there are any mail arrivals. In this manner, the user is able to carry out an inquiry about the arrival of mails while operating an appropriate menu or menus, thereby alleviating the operation load on the part of the user.

However, when an inquiry about the reception of electronic mails is made through menu operations, it is generally necessary to take a lot of operational steps while following multiple stages from menus as mentioned above and hence such operations are not necessarily simple. In particular, the above-mentioned operations are rather complicated under situations where mail inquiries need be carried out frequently or promptly. Therefore, if an inquiry of mail reception could be performed through a reduced number of operational steps, for example only a single operational step, in a portable terminal, the user would be able to perform such an operation in an extremely simple and prompt manner, thus making it possible to improve the convenience or ease of operation. In addition, in case of a known foldable portable terminal, if inquiries could be made with the portable terminal being in its folded state while being carried about by a user, the convenience or ease of operation would be more excellent.

SUMMARY OF THE INVENTION

The present invention has been made in view of the above-mentioned circumstances, and has for its object to provide a portable terminal and a communication connection method thereof in which a user is able to carry out the operation of connecting the portable terminal to a mail server device in an extremely simple and prompt manner, so that user's operation for inquiring about the reception of electronic mails, message information, etc., for example, can be performed extremely simply and quickly.

In order to achieve the above object, according to one aspect of the present invention, there is provided a portable terminal having a function of connecting itself to a prescribed server device through a communication line. The portable terminal includes a prescribed button key, depression detection means for detecting that the prescribed button key is kept depressed for a predetermined time or longer, and connection means for performing connection to the server device based on a detection signal of the depression detection means.

With such a configuration, the portable terminal is connected to the prescribed server device just by pressing down the prescribed button key over the predetermined time or longer. For instance, the portable terminal can be connected to the server device receiving electronic mails in a simple and prompt manner, thus making it possible for the user to inquire about or download arrived mails, arrived message information or message data. Message information is the information provided in push delivery services such as, for example, news flashes, weather forecasts, etc. In the above-mentioned configuration, by assuming as a requirement the condition that the prescribed button key is kept depressed for the predetermined time or longer, it is possible to prevent the portable terminal from being unnecessarily connected to the server device due to careless depression of the button key by the user, or due to accidental depression of the button key by an object striking thereagainst. As a result, occurrence of uselessly connected communication costs can be avoided. In addition, by pressing the button key for a period of time less than the predetermined time, other operational instructions can be executed with the button key, thus making the button key available for a lot of usages as an operation means. Although in the following description of a preferred embodiment of the present invention, a cellular phone is taken as a concrete example of the portable terminal, the portable terminal may include other portable terminals such as a PDA, etc., which are constructed for the purpose of portability.

Preferably, the portable terminal further includes download execution means for downloading electronic mails from the server device when connection to the server device which is capable of receiving electronic mails is performed by the connection means. Accordingly, the electronic mails stored in the server device can be downloaded to the portable terminal quite simply and quickly. Preferably, the prescribed button key comprises a rear key provided on a rear surface of the portable terminal, and the rear key is arranged at a position different from a main operation portion. As a result of such an arrangement, the user can confirm the position of the button key quite easily. Preferably, the portable terminal further includes a main operation part and a main display, wherein the portable terminal is of a foldable structure enabling the main operation part and the main display to be opened and closed with respect to each other. The button key is depressible in a folded state of the portable terminal in which the main operation part is closed to the main display. With this arrangement, the user can connect the portable terminal to the server device with the portable terminal being kept folded. Additionally, in this case, a sub display for displaying information on electronic mails from the server device may be arranged in an appropriate location in the vicinity of the prescribed button key in such a manner that it is visible in the folded state of the portable terminal. With this arrangement, the user can easily know the results of connected communications such as mail inquiries with the portable terminal being kept folded, thus providing excellent usability or ease of operation.

Moreover, it is preferable that the prescribed button key and the sub display be arranged on a rear side of a casing provided with the main display in an open state of the portable terminal. With this arrangement, a narrow space on the casing surface of the portable terminal can be used effectively. In addition, the portable terminal may further include opened/closed state detection means for detecting an opened state and a closed state of the portable terminal which is of the foldable structure. The connection means performs connection to the server device when the closed and/or open state of the portable terminal is detected by the opened/closed state detection means. In a preferred embodiment of the present invention, the connection can be made in either the closed state or the open state of the portable terminal, but if the connection can be made only in the closed state, it is possible to perform the connection to the server device with the portable terminal being in its folded state, and the button key can also be used for other operational purposes when the portable terminal is in its open state. Thus, in this case, too, a narrow operational space on the casing surface of the portable terminal can be used in an effective manner.

According to another aspect of the present invention, there is provided a portable terminal of a foldable structure including a main operation part and a main display part, which are able to be opened and closed. The portable terminal includes a rear key arranged on a rear surface of a panel provided with the main display part, and a sub display arranged on the rear surface of the panel in such a manner as to be able to display prescribed information based on an operation of the rear side key. When the rear key is kept depressed for a predetermined time or longer, the depressed state of the rear key is detected whereby the portable terminal is connected to a prescribed server device, thus enabling prescribed information from the server device to be displayed on the sub display. With this configuration, it is possible to provide the portable terminal with all the effects as referred to above.

According to a further aspect of the present invention, there is provided a communication connection method for connecting a portable terminal to a prescribed server device through a communication line. The method includes the steps of: detecting when a prescribed button key is kept depressed for a predetermined time or longer; connecting the portable terminal to the prescribed server device through the communication line when the prescribed button key is depressed; and receiving prescribed information from the prescribed server device. With this method, the user is able to carry out the operation of connecting the portable terminal to the prescribed server device in an extremely simple and prompt manner. Accordingly, for example, an inquiry operation for inquiring about mail reception to the server device can also be performed extremely simply and quickly.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 3 is a table showing how to use a rear key in the embodiment of the present invention.

DETAILED DESCRIPTION OF THE PREFERRED EMBODIMENTS

Now, a preferred embodiment of the present invention will be described below in detail while referring to the accompanying drawings.

The embodiment of the present invention describes, as a portable or mobile terminal, a foldable cellular phone that is provided on its rear side with a sub LCD and a rear side key.

Figures 1A, 1B:
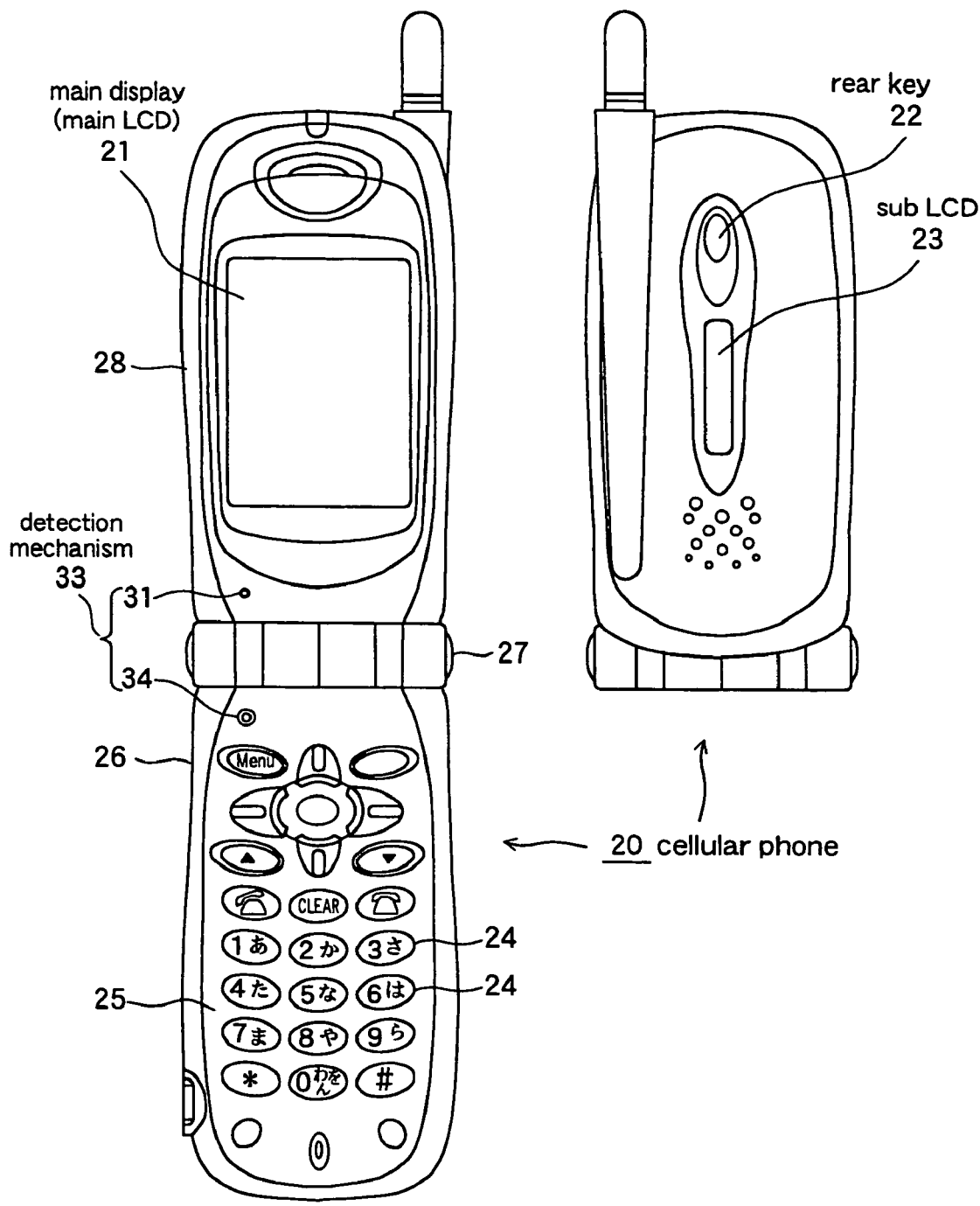
FIG. 1(a) is a view showing the appearance of a foldable cellular phone in its unfolded state according to one embodiment of the present invention.
FIG. 1(b) is a view showing of the rear side of the foldable cellular phone in its folded state.

FIGS. 1(a) and 1(b) are views showing one example of the external appearance of the foldable cellular phone, in which FIG. 1(a) illustrates the appearance of the foldable cellular phone in its opened or unfolded state, and FIG. 1(b) illustrates the appearance of the foldable cellular phone in its closed or folded state.

The cellular phone 20 includes an operation part side 26 forming a main operation part 25 with a plurality of button keys 24, and a display part side 28 forming a main display (main LCD) 21 and being swingably or foldably coupled at its one end with the operation part side 26 through a swing shaft 27. In an open or unfolded state of the cellular phone 20, a user can operate the main operation part 25 and visually check the main display 21, whereas in a folded state of the cellular phone 20, these main display 21 and main operation part 25 are closed into a compact form so that they are isolated from the exterior.

Figure 2:
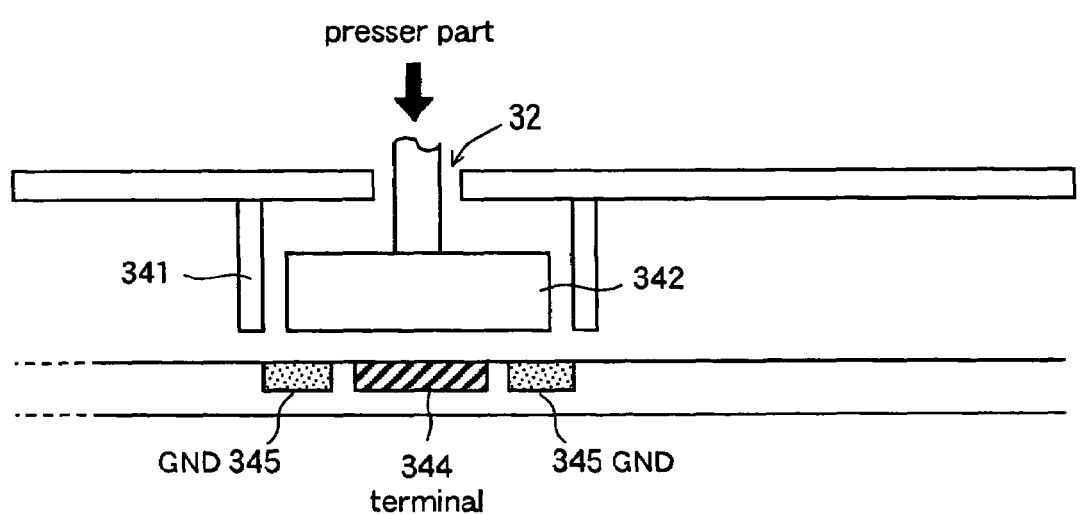
FIG. 2 is a view showing an opened/closed state detection switch.

In the vicinity of the swing shaft 27, there is provided a detection mechanism 33 which acts as a detection means for detecting the opened or closed state of the cellular phone 20. This detection mechanism 33 includes a presser part 31 which protrudes from a casing surface of the display part side 28, and a push switch 34 (to be described later with reference to FIG. 2) which is arranged in a concave portion 32 formed on a casing surface of the operation part side 26 in such a manner that it is pushed down to be closed by the presser part 31. The push switch 34 is constructed in the following manner, as shown in FIG. 2. That is, a switch pad 342 formed at an inner end of a push rod (unnumbered) is arranged in a rib 341 formed on a rear or inner surface of the casing of the operation part side 26 so as to be movable in the vertical direction. The switch pad 342 is urged in an upward direction by spring (not shown) in the form of a coiled spring or flat spring. Thus, by pushing down the switch pad 342 against the resilient force of the spring, a prescribed terminal 344 arranged on the bottom of the concave portion 32 is electrically connected with ground (GND) 345. In this manner, the open or closed state of the foldable cellular phone 20 is detected by the potential of the terminal 344.

As shown in FIG. 1(b), a rear key (rear side key) 22, which constitutes a prescribed button key of the present invention, and a sub display in the form of a sub LCD 23 are arranged on the rear surface of the main display 21 at locations mutually adjacent to each other. The rear key 22 is controlled to simply light or flash so that it is used to indicate various operating conditions of the cellular phone 20. Alternatively, the rear key 22 is available to change the display of the sub LCD 23. In addition to these purposes, the rear key 22 is also used for the operation of mail inquiries, as will be described later. The sub LCD 23 is available to display a variety of pieces of information by operating the rear key 22. That is, for example, the sub LCD 23 can be switched to display the date and time, mail arrival information, voice arrival information, etc. Here, note that how to use the rear key 22 including mail inquiries in this embodiment is illustrated in a table in FIG. 3. As clearly seen from this table, there are some modes of operation for the rear key 22 used for different purposes at the time when the cellular phone 20 is opened or closed. In addition, different functions are executed when the rear key 22 is pressed or depressed in a short time (short pressing) or in a long time (long pressing). FIG. 3 shows that various functions are executed in a separate and distinct manner by a short pressing or a long pressing depending upon various operating conditions including the open and closed states, the state of communications, and waiting, respectively.

Figure 4:
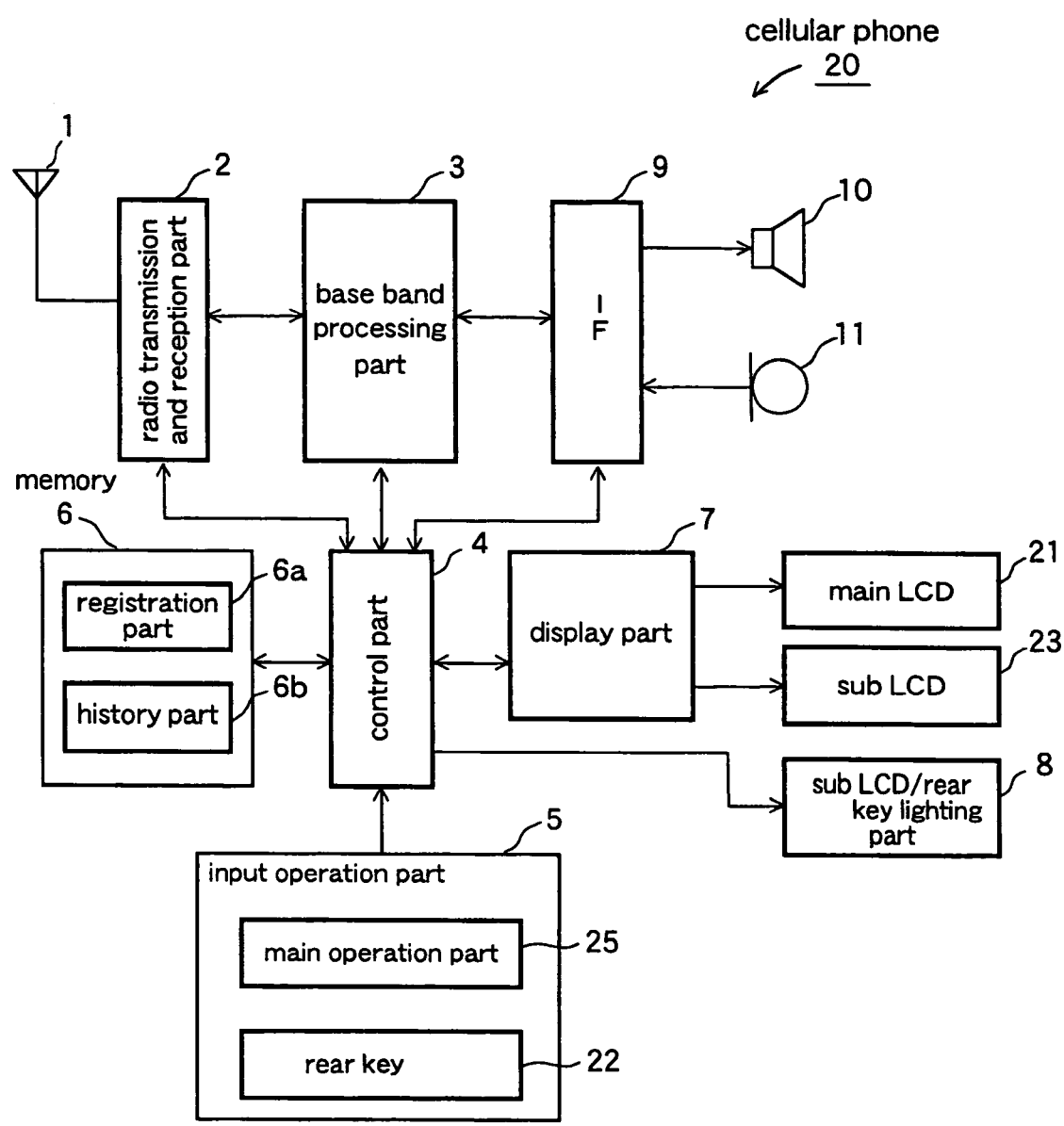
FIG. 4 is a block diagram schematically illustrating one example of the hardware configuration of the cellular phone in the embodiment of the present invention.

FIG. 4 is a block diagram which schematically shows one example of the hardware configuration of the cellular phone 20. In the cellular phone 20 shown in FIG. 4, a radio transmission and reception part 2 provided with an antenna 1, a base band processing part 3, an input operation part 5 by which the user is able to input telephone numbers and various pieces of information through key operations, a memory 6 having a registration part 6a and a history part 6b, a display part 7, the sub LCD 23, and a rear key lighting part 8 are all electrically connected to a control part 4. In addition, a speaker 10 and a microphone 11 are also electrically connected to the control part 4 through an interface (IF) 9. The input operation part 5 includes the rear key 22 in addition to various kinds of keys arranged in the main operation part 25. The display control part 7 is electrically connected to the main display (main LCD) 21 and the sub LCD 23 shown in FIG. 1 so as to perform display control on the respective LCDs 21, 23.

Figure 5:
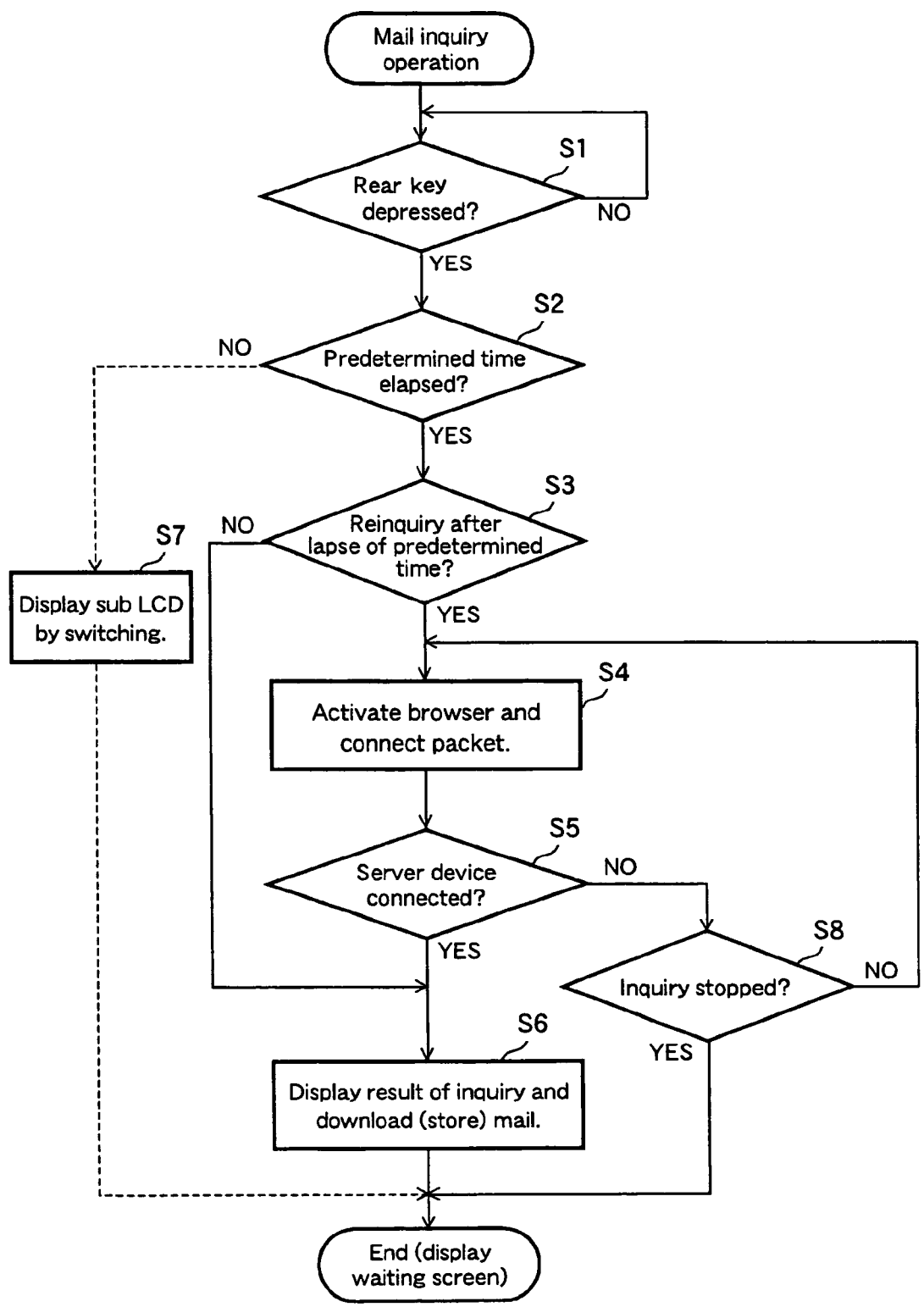
FIG. 5 is a flow chart showing a mail inquiry operation as an operation of the embodiment of the present invention.

Hereinafter, reference will be made to a mail inquiry operation according to this embodiment of the present invention while using FIG. 5.

First of all, when it is detected that the rear key 22 is depressed or pressed down (step S1), it is determined whether the duration time of the depression or pressing is equal to or longer than a predetermined time (a long depression or pressing: 1 second for instance) (step S2). When the duration time is equal to or longer than the predetermined time (YES in step S2), it is then determined whether a prescribed period of time has elapsed from an inquiry operation carried out last time (step S3). Only when the prescribed period of time has elapsed (YES in step S3), a browser is activated and a packet connection is started so that the cellular phone 20 is connected to a server device (step S4). The reason for the provision of step S3 in which the connection is made only after the lapse of the prescribed period of time is as follows. That is, even if reconnection is made at a time point when a sufficient time has not yet elapsed from the last connection, there would be rather a low probability of the arrival of a new mail, and hence it is possible to avoid the cost of connected communications due to useless or meaningless connection. If it is determined in step S3 that the prescribed period of time has not yet elapsed (NO in step S3), the flow jumps to step S6 to be described later, where the result of the inquiries already made and information on the mails downloaded and stored into the cellular phone 20 are displayed.

If the result of the determination in step S4 is positive (YES in step S4), it is determined whether the connection to the server device has been made (step S5). If a determination is made that the connection to the server device has been made (YES in step S5), the result of the inquiries is displayed at the sub LCD 23, and newly arrived mails, if any, are downloaded and stored into the registration part 6a of the memory 6 (step S6). An indication of the sub LCD 23 is displayed like "newly arrived mails xx pieces" for instance. Note that during the mail inquiry operation, an indication to that effect is displayed in the sub LCD 23. For instance, an indication "during inquiry" is made, and during the inquiry operation, the rear key 22 may exhibit a flashing state by alternately lighting two kinds of luminescent colors for instance. After the inquiry result is displayed, the screen of the sub LCD 23 is shifted to another one manually by user's operation or automatically after the lapse of a predetermined time.

On the other hand, when it is determined in step S2 that the depression or pressing time of the rear key 22 does not reach the predetermined time, a determination is made that the pressing operation is a display switching operation to the sub LCD 23 for instance, and then in step S7, the display of the sub LCD 23 is switched over. Here, note that this operation is different or separate from the mail inquiry operation, with the flow of processing for this operation being shown by a broken line in FIG. 5. In this embodiment, however, the content of the instruction of the rear key 22 is varied depending upon the pressing time thereof, so that many kinds of functions can be executed by a limited number of keys as in the case of cellular phones which are subjected to restrictions on the arrangement space for button keys.

Moreover, when it is determined in step S5 that the connection to the server device has not yet been made, a determination is then made whether the inquiry is to be aborted (step S8). If not aborted (NO in step S8), a return to step S4 is carried out, whereas if aborted (YES in step S8), the inquiry operation is terminated. In this connection, note that when the connection to the server device has not yet been carried out in step S5, in order to receive user's instruction for the determination in step S8, an indication to that effect is displayed at the sub LCD 23. Alternatively, a setting may be made such that the connection to the server device can be automatically tried up to a predetermined number of times, and it is determined in step S8 whether the number of connections tried has reached the predetermined number of times.

Further, although in this embodiment, the connection of communications is carried out by a long depression or pressing of the rear key 22 in any of the open and closed states of the cellular phone 20 in FIG. 3, it goes without saying that such connection can be made only in either one of these states, e.g., particularly in the closed state alone, based on the detection signal of the opened/closed state detection mechanism 33, and a long pressing of the rear key 22 may be used as a different instruction in the open state of the cellular phone 20. In this case, for instance, a step of determining whether the cellular phone 20 is in its open state or in its closed state is provided between steps S2 and S3 in the above-mentioned flow chart of FIG. 5, and when determined to be in the closed state, the flow proceeds to step S3. Thus, according to such a modification or mode of use, the connection of communications can be performed with the cellular phone 20 being kept closed when carried about by the user. In addition, the same rear key 22 is available for another purpose when the cellular phone 20 is open, whereby the limited space of the portable terminal can be used effectively.

As explained above, in this embodiment of the present invention, a mail inquiry can be made just by pressing the rear key 22 for a period of time equal to or longer than a predetermined time. Accordingly, the rear key 22 can be manipulated with a one-touch operation, making it possible to perform the operation of the rear key 22 in an extremely simple and quick manner. In addition, a mail inquiry can be made with the foldable cellular phone remaining in its closed state though the foldable cellular phone is generally carried about in its closed state by the user. Moreover, the user can know the result of the inquiry, and hence it is possible to further enhance the effect that the mail inquiry can be made simply and promptly.

Although the cellular phone has been described in the above embodiment, it is needless to say that the present invention can also be applied to other portable terminals such as a PDA or the like. Additionally, the connection to the server devise is made for a mail inquiry in the above embodiment, but the present invention can also be applied to the case where one wants to check or download the information other than electronic mails stored in the server device side. For instance, the present invention is available, too, to inquire about or download message information or message data provided in push delivery services such as news flashes, weather forecasts, etc.

As described in detail in the foregoing, according to the present invention, the user can carry out the operation of connecting a portable terminal to a prescribed server device in an extremely simple and prompt manner. Accordingly, it is possible to provide a portable terminal and a communication connection method thereof by which the user is able to perform the operation of inquiring about and/or downloading mail information, message information or message data, for instance, stored in the server device extremely easily and promptly.

While the invention has been described in terms of a preferred embodiment, those skilled in the art will recognize that the invention can be practiced with modifications within the spirit and scope of the appended claims.

What is claimed is:

1. A portable terminal having a function of connecting to a prescribed server device through a communication connection, said portable terminal comprising:
   a prescribed button key;
   a depression detection unit for detecting that said prescribed button key is kept depressed for a predetermined time or longer;
   a connection unit for connecting to said server device based on a detection signal from said depression detection unit;
   a main operation part and a main display, wherein said portable terminal is of a swingable structure enabling said main operation part and said main display to be opened and closed with respect to each other, said button key being depressible in a closed state of said portable terminal in which said main operation part is closed with respect to said main display; and
   an opened/closed state detection unit for detecting an opened state and a closed state of said portable terminal which is of the swingable structure, wherein said connection unit performs connection to said server device when the closed state of said portable terminal is detected by said opened/closed state detection unit.

2. The portable terminal according to claim 1, further comprising a sub display for displaying information on electronic mails from said server device, said sub display being arranged in a vicinity of said prescribed button key in such a manner that said sub display is visible in the folded state of said portable terminal.

3. The portable terminal according to claim 2, wherein said prescribed button key and said sub display are arranged on a rear side of a casing provided with said main display in an open state of said portable terminal.

4. The portable terminal according to claim 1, further comprising a download execution unit for downloading electronic mails from said server device when connected to said server device.

5. The portable terminal according to claim 1, further comprising an inquiry unit for inquiring whether there are mail arrivals in said prescribed server device when connected to said prescribed server device.

6. The portable terminal according to claim 1, wherein said prescribed button key comprises a rear key provided on a rear surface.

7. The portable terminal according to claim 1, wherein a first function is executed by a short pressing of said prescribed button key and second function is executed by a long pressing of said prescribed button key.

8. A portable terminal of a foldable structure including a main operation part and a main display part which are able to be opened and closed with respect to each other, said portable terminal comprising:
   a rear key arranged on a rear surface of a panel provided with said main display part; and
   a sub display arranged on the rear surface of said panel in such a manner as to be able to display prescribed information based on an operation of said rear key;
   wherein when said rear key is kept depressed for a predetermined time or longer, a depressed state of said rear key is detected and said portable terminal is connected to a prescribed server device, thus enabling prescribed information from said server device to be displayed on said sub display,
   wherein said portable terminal is of a swingable structure enabling said main operation part and said main display part to be opened and closed with respect to each other, said rear key being depressible in a closed state of said portable terminal in which said main operation part is closed with respect to said main display part; and
   further comprising an opened/closed state detection unit for detecting an opened state and closed state of said portable terminal which is of the swingable structure, wherein said connection unit performs connection to said sewer device when the closed state of said portable terminal is detected by said opened/closed state detection unit.

9. The portable terminal according to claim 8, wherein a first function is executed by a short pressing of said rear key and second function is executed by a long pressing of said rear key.

10. A communication connection method for connecting a portable terminal to a prescribed server device through a communication connection, said portable terminal is of a swingable structure enabling a main operation part and a main display to be opened and closed with respect to each other, said method comprising the steps of:
   detecting when a prescribed button key is depressed for a predetermined time or longer;

connecting said portable terminal to said prescribed server device through said communication connection when said prescribed button key is depressed;

receiving prescribed information from said prescribed server device;

opening and closing said main operation part and said main display with respect to each other, depressing said prescribed button key in a closed state of said portable terminal in which said main operation part is closed to said main display;

detecting a closing of said main operation part with respect to said main display; and connecting said portable terminal to said server device when said closing of said main operation part with respect to said main display is detected.

11. The method according to claim 10, further comprising:

executing a first function by a short pressing of said prescribed button key; and executing a second function be a long pressing of said prescribed button key.

* * * * *

UNITED STATES PATENT AND TRADEMARK OFFICE
CERTIFICATE OF CORRECTION

| | |
|---|---|
| PATENT NO. | : 7,389,326 B2 |
| APPLICATION NO. | : 11/591499 |
| DATED | : June 17, 2008 |
| INVENTOR(S) | : Susumu Aoyama |

It is certified that error appears in the above-identified patent and that said Letters Patent is hereby corrected as shown below:

Column 8, Line 5, change "folded" to --closed--.

Column 8, Line 51, change "sewer" to --server--.

Column 10, Line 8, change "be" to --by--.

Signed and Sealed this

Seventh Day of October, 2008

JON W. DUDAS
*Director of the United States Patent and Trademark Office*